United States Patent [19]

Amellal

[11] Patent Number: 4,609,128
[45] Date of Patent: Sep. 2, 1986

[54] VOLUMETRIC MEASURING-DOSING DEVICE FOR FLUIDS

[76] Inventor: Odile Amellal, 4 Rue Robert De Flers, 75015 Paris, France

[21] Appl. No.: 755,346

[22] Filed: Jul. 16, 1985

[30] Foreign Application Priority Data

Jul. 19, 1984 [FR] France ................ 84-11473

[51] Int. Cl.$^4$ .............................................. B67D 5/56
[52] U.S. Cl. .................................. 222/129; 222/135; 91/495; 417/465
[58] Field of Search ................ 222/129, 129.2, 135, 222/71, 137; 91/491, 495; 417/465

[56] References Cited

U.S. PATENT DOCUMENTS

| | | | |
|---|---|---|---|
| 1,051,306 | 1/1913 | Bertrand et al. | 91/495 X |
| 2,507,361 | 5/1950 | Widmer | 91/495 X |
| 2,796,196 | 6/1957 | Ortner | 222/129 X |
| 3,204,571 | 9/1965 | Mosbacher | 417/465 |
| 4,269,327 | 5/1981 | Welch | 222/135 |

FOREIGN PATENT DOCUMENTS 944568 4/1949 France .
1012516 7/1952 France .
5599 of 1911 United Kingdom .

*Primary Examiner*—Joseph J. Rolla
*Assistant Examiner*—Jay I. Alexander
*Attorney, Agent, or Firm*—Wenderoth, Lind & Ponack

[57] ABSTRACT

The device permits dosing a secondary fluid in a principal fluid and comprises a body (1) in which is provided a passageway (20) for the circulation of the principal fluid and having an inlet orifice (22) and distribution orifices (23) for the fluid, which distribution orifices open onto a cylindrical chamber (3) defined by a housing (2), the chamber (3) containing means (39, 16, 19, 27, 28, 30) for driving a pump (36) of the secondary fluid which comprise three pistons (30) mounted on radial rods (16) pivotally mounted on an arm (15) of a crank (39) adapted to drive in alternating translation a dosing piston (35) of the pump (36). Each piston (30) is slidable in a cylinder (28) pivotally mounted on a pin (40). This measuring-dosing device delivers additive in proportion to the rate of flow of the principal fluid in synchronism with the crank (39) and without the use of any spring.

12 Claims, 6 Drawing Figures

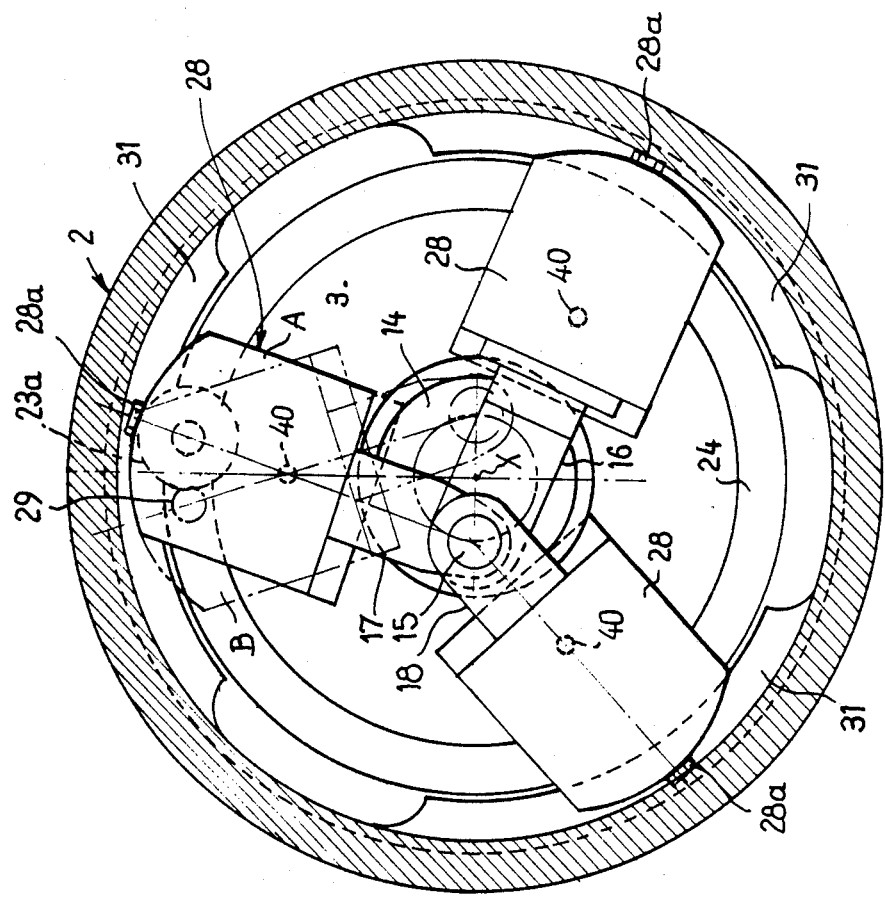
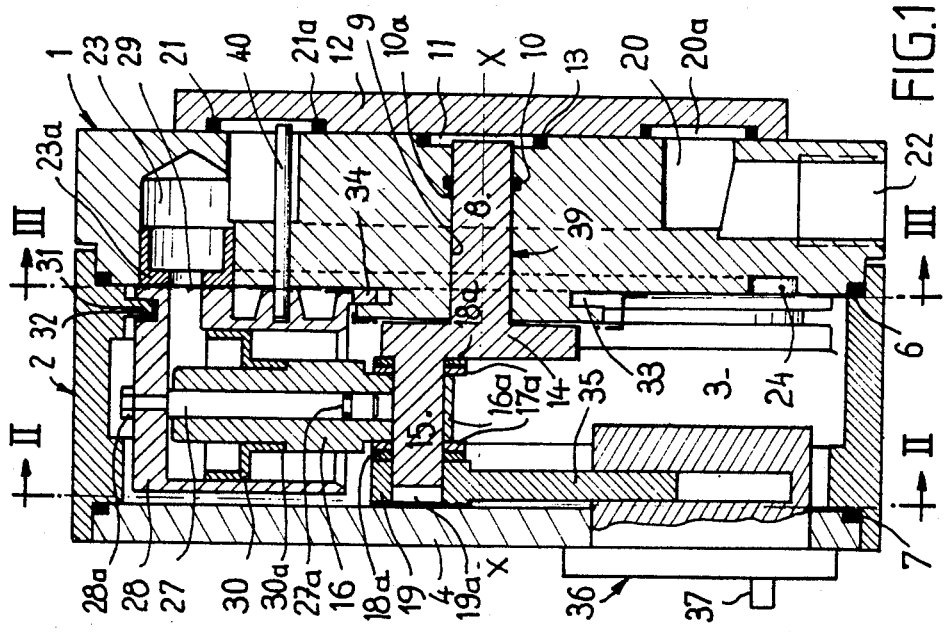

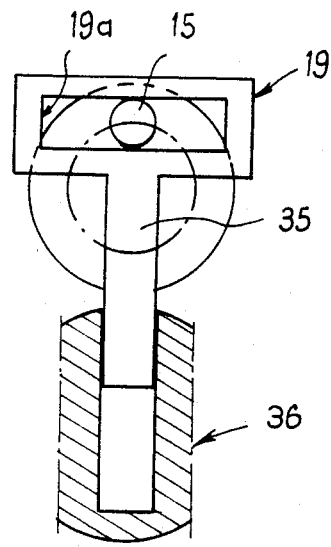
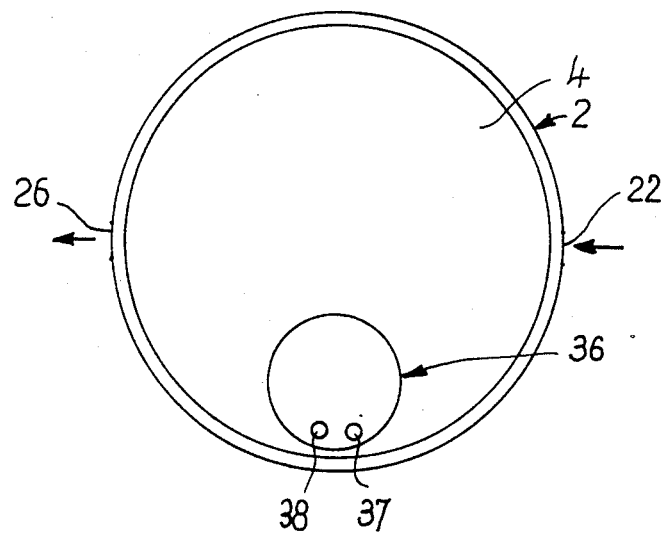

VOLUMETRIC MEASURING-DOSING DEVICE FOR FLUIDS

The present invention relates to a volumetric measuring-dosing device for fluids of utility in the continuous dosing of a fluid in various industrial and agricultural fields, such as, for example, the dosing of a feeding liquid for the industrial raising of poultry, pigs, rabbits, for the irrigation or any other application requiring a continuous supply of fluid at a reproducible rate of flow. This device therefore permits the dosing of a secondary fluid, or a fluid which is added to a main fluid, for example water.

Systems are known which employ an alternating water motor driving a dosing piston for the additive. Such systems permit an addition of secondary fluid which is strictly proportional to the rate of flow of the principal fluid, but their complex design renders them expensive and difficult to operate in a satisfactory manner.

Another known device comprises a rotor disposed within a cylinder, the principal fluid circulating in the space defined between two elements so as to drive, through suitable means, the rotor on which is disposed at least one piston which communicates with a central secondary fluid supply orifice. The alternating motion of the piston produced by the rotation of the rotor enables the secondary fluid to be aspirated and expelled so as to inject it into the principal fluid in proportion to the rate of flow of the latter.

Such a device requires a large number of component parts, in particular springs, which renders its manufacture expensive and experience has shown that it does not give full satisfaction.

In order to overcome these drawbacks, an object of the invention is to provide a measuring-dosing device for fluids which delivers a flow of additive in proportion to the flow of the principal fluid while having the advantage of requiring only a small number of distinct component parts.

The invention provides a measuring-dosing device for fluids comprising a body in which is provided a passageway for the circulation of a principal fluid having an inlet orifice for the fluid and fluid supply ports which extend through the body and communicate with a chamber defined by a housing adapted to be fixed to the side of the body onto which the principal fluid supply ports open, the chamber containing means for driving a pump for a secondary fluid intended to be mixed with the principal fluid.

According to the invention, the means driving the pump comprise at least three driving pistons mounted on radially extending rods pivotally mounted on an arm of a crank, extending in a direction parallel to the axis of the body and adapted to drive in reciprocating translation a dosing piston of the pump, each driving piston being slidable in a cylinder mounted to be pivotable about a pin carried by the body and parallel to the axis of the body, and each cylinder is provided with a principal fluid inlet port in the cylinder when the inlet port is positioned angularly in alignment with a corresponding supply orifice of the body, means being provided for permitting the discharge of the principal fluid into the chamber of the housing during the oscillations of the cylinders on each side of the orifices ports.

This measuring-dosing device comprises only a minimum number of different parts which do not require springs and this simplifies the structure and the design of the device. Further, the pistons have a motion which is perfectly synchronized by the crank.

Further features and advantages of the invention will be apparent from the following description of an embodiment of the invention which is given by way of example with reference to the accompanying drawings in which:

FIG. 1 is an axial sectional view of one embodiment of the device according to the invention, with a part cut away;

FIG. 2 is a cross-sectional view taken on line II—II of FIG. 1, the pump of the secondary fluid having been eliminated in order to render the FIG. 2 more clear;

FIG. 5 is a partial sectional view taken on line II—II of FIG. 1, to an enlarged scale and showing the secondary fluid pump;

FIG. 6 is a diagrammatic elevational view of the side of the device shown in FIG. 1 on which the secondary fluid pump is mounted.

Figure 4:
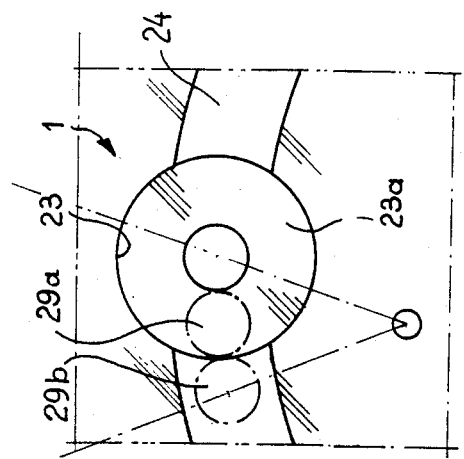
FIG. 4 is a partial view to an enlarged scale in the plane of FIG. 3.

The measuring-dosing device for fluids shown in FIGS. 1 to 6 is adapted to inject a dose of secondary fluid into a stream of principal fluid, for example a stream of water used in the industrial raising of poultry so as to feed the latter, or the addition of cutting oil to the water in a machine-tool, or the addition of liquid fertilizer to spraying water.

This device comprises a body 1 in which is formed a passageway 20 for the circulation of a principal fluid. The passageway has a fluid inlet orifice 22 and distribution ports 23 of the fluid which extend through the body 1 and open into a cylindrical chamber 3 defined by a housing 2 adapted to be fixed to the side of the body 1 onto which the distribution ports 23 open, the number of ports being three in the presently-described embodiment, these ports being angularly evenly spaced apart.

The chamber 3 is closed by a cover 4 and contains means for driving a pump 36 for a secondary fluid which is intended to be mixed with the principal fluid.

According to a feature of the invention, the means for driving the pump 36 comprise three pistons 30 mounted on rods 16, 17, 18 which extend radially and are pivotally mounted on an arm 15 of a crank 39 which is parallel to the axis X—X of the body 1. The arm 15 is adapted to drive in reciprocating translation a dosing piston 35 of the pump 36, each piston 30 being slidable in a cylinder 28 which is pivotally mounted on a pin 40 which is carried by the body 1 and is parallel to the axis X—X of the latter. Each cylinder 28 is provided with an inlet port 29 for the admission of the principal fluid into the cylinder 28 when the latter is angularly positioned in alignment with a corresponding distribution port 23. Means are also provided for allowing the discharge of the principal fluid into the chamber 3 of the housing 2 during the oscillations of the cylinders 28 on each side of the distribution ports 23.

Fixing bolts (not shown) for fixing the cover 4 are screwed into tapped holes 5 (FIG. 3) in the side of the housing 2 facing the cover 4. The sealing of the chamber 3 is provided by O-rings 6 and 7 respectively disposed within the body 1 and the housing 2 and between the latter and the cover 4 (FIG. 1).

On the side of the body 1 opposed to the chamber 3, the principal fluid supply passageway 20 constitutes a ring which is closed by a plate 12 which has in confronting relation to the passageway 20 a circular cavity 20a whose width is substantially greater than that of the passageway 20 for receiving on each of its edge portions an O-ring 21 and 21a (FIG. 1). An inlet orifice 22 of the principal fluid is provided in the body 1 and is perpendicular to the axis X—X and communicates with the passageway 20.

Each of the ports 23 is provided with a sealing cup 23a whose end wall is provided with an opening at its center and is adjacent to the chamber 3.

The crank 39 comprises a shaft 8, a disk 14 and the arm 15 in a single piece. The shaft 8 is fixed at one of its ends to the center of the disk 14 which receives on the side opposed to the shaft 8 the arm 15 which has an eccentric position on the disk 4. The shaft 8 is rotatively mounted on the axis X—X of the body 1 and the housing 2 in an opening 9 of the body 1 a sealing O-ring 10 disposed in a groove 10a formed transversely of the length of the opening 9 being provided for sealing the chamber 3. The free end of the shaft 8 extends into a cavity 11 on the side of the body 1 opposed to the housing 2, this cavity being closed by the plate 12. A sealing O-ring 13 (FIG. 1) is provided between these two elements.

The end of the arm 15 adjacent to the cover 4 extends into a transverse recess 19a formed in a cross-member 19 which is fixed to the dosing piston 35 of the secondary fluid pump 36 in such manner as to form a T with said dosing piston 35 (FIGS. 1 and 5). With reference to FIG. 6, there is shown the arrangement of the pump 36 which is incorporated into the cover 4. Its inlet 37 and outlet 38 are oriented outside the device and are respectively connected to the secondary fluid reservoir (not shown) and to the outlet 26 of the principal fluid in the known manner (not shown).

The means for driving the pump 36 comprise three rods 16, 17, 18, which are rotatively mounted on the arm 15 of the crank 39 in such manner that an end 16a of the rod 16 which cooperates with the arm 15 has a reduced or narrow portion for receiving branches 17a of the rod 17 which are inserted between branches 18a of the rod 18 so that the three rods 16, 17, 18 are located in a common radial plane.

The rods 16, 17, 18 each slide along a shaft 27 fixed to the inner wall of a cylinder 28 by means of a nut 28a. A sealing element 27a is provided in the vicinity of the free end of each shaft 27.

The three cylinders 28 have rounded end walls and are arranged to be angularly equally spaced apart and each of their openings 29 has a diameter equal to that of the orifice of the sealing cups 23a opening onto the body 1 so that the arc of a circle described by the center of the opening 29 in the course of the pivoting of the cylinder 28 on each side of the corresponding port 23 passes substantially through the center of the latter.

These shafts 27 are so disposed that the opening 29 formed in each cylinder 28 coincides with the orifice of the corresponding cup 23a in an end position of its oscillation and is tangent to the outside of the cup 23 in the other end position of its oscillation (29b, FIG. 4). Thus the diameter of the inlet opening 29 is equal to the difference between the outside and inside radii of the cup 23a.

Each rod 16, 17, 18 carries a flexible piston 30 which has the shape of a skirt having an end of larger diameter which is adjacent to the inner end of the cylinder 28.

The pistons 30 bear against an annular shoulder 30a provided on each rod 16, 17, 18 so that the edge of the piston 30 adjacent to the inner end of the cylinder is substantially aligned with the inlet opening 29 of the cylinder. Each of the cylinders 28 is guided in the chamber 3 in the course of its oscillations, on one hand, by a projection 31 formed inside the housing 2 in the vicinity of the body 1 which cooperates with a groove 32 in confronting relation with the projection 31 on the cylinder 28 and, on the other hand, by a circular recess 33 formed in the body 1 at the rear of the disk 14 which cooperates with a lug 34 provided at the open end of the cylinder 28 in the vicinity of the body 1.

Figure 3:
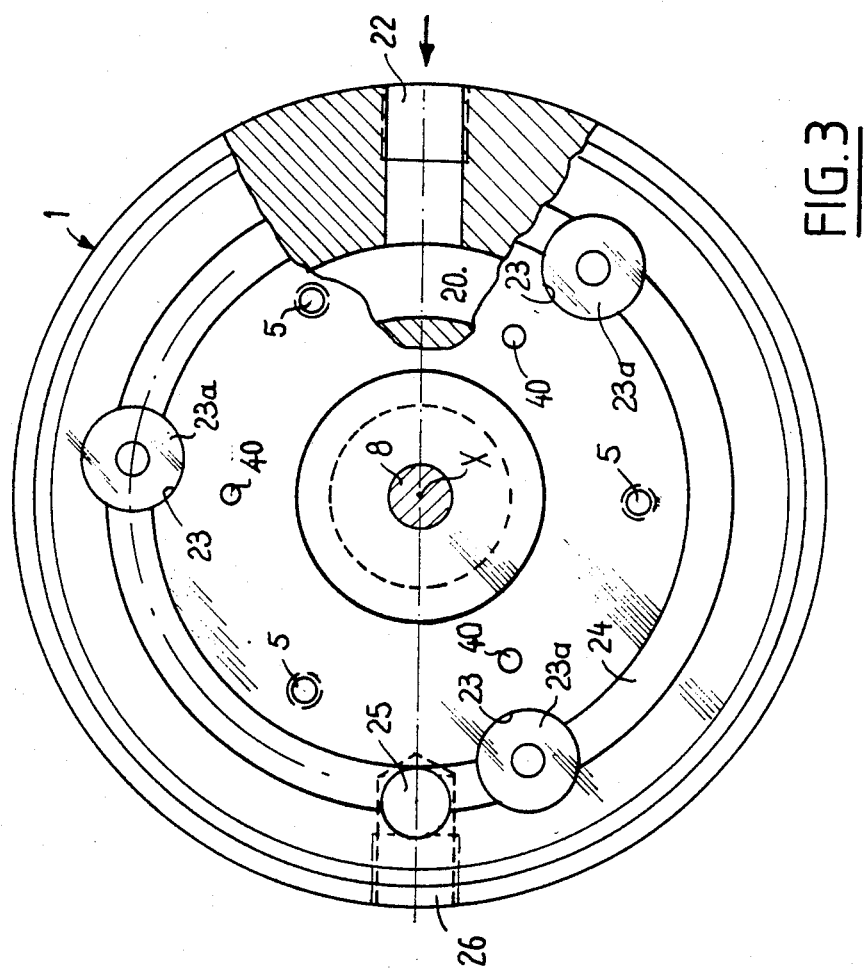
FIG. 3 is a sectional view taken on line III—III of FIG. 1, with a part cut away.

The means for the discharge of the principal fluid comprise a circular groove 24 in the illustrated embodiment, formed inside the chamber 3 on the side of the body 1. The groove 24 passes through the three distribution ports 23 and is interrupted by each cup 23a and communicates with a discharge orifice 25 for the principal fluid which is parallel to the axis X—X. This orifice 25 communicates with a principal fluid outlet orifice 26 formed in the side of the body 1 in diametrically opposed relation to the inlet orifice 22 (FIG. 3).

The fluid measuring and dosing device just described operates in the following manner:

The principal fluid enters the passageway 20 through inlet 22 posses through openings 23 and 29, and fills the chamber of the cylinder 28 defined between the piston 30 and the inner end of the cylinder 28 whose inlet port 29 is at least partly in facing relation to the orifice of the corresponding cup 23a. The filling of the cylinder 28 causes the piston 30 to slide and this causes, through the rod 16, 17 or 18 which slides along the shaft 20, the rotation of the arm 15 of the crank 39 around the axis X—X.

In the course of the rotation of the crank 39 around the axis X—X on the arm 15 of which the rods 16, 17, 18 pivot, the cylinders 28 move in succession and progressively by oscillation about the pins 40 from one end position A (FIG. 2) in which the inlet port 29 is in confronting relation to the corresponding distribution port 23 (filling position), to an opposite end position B (FIG. 2) in which the inlet port 29 is in confronting relation to the discharge groove 24 (emptying position). It will be understood that, in the course of the oscillations of the cylinders 28, the inlet ports 29 pass through an intermediate or dead-centre position 29a (FIG. 4) in which the inlet port 29 is in confronting relation to the annular part of the end wall of the sealing cup 23a.

The principal fluid fills the chamber 3 and is discharged to the outlet orifice 26 through the orifice 25.

The movement of the crank around the axis X—X brought about by the reciprocating motion of the pistons 30 in the cylinders 28 under the driving effect of the pressure of the principal fluid brings about a reciprocating motion of the dosing piston 35 of the pump 36 of the secondary fluid, the end of the crank 15 engaged in the cross-member 19 undergoing reciprocating movements in its opening 19a. These movements are therefore accompanied by the aspiration of the secondary fluid and its discharge into an outlet passageway of the principal fluid in proportion to the rate of flow of the latter.

Such a fluid measuring and dosing device results in a precise and reproducible dosing of the secondary fluid in the principal fluid while it is of simple design and of low constructional cost. The device has the further advantage of not employing a spring.

In a modification of the invention, the sealing cups 23a may be replaced by annular sealing elements.

I claim:

1. A measuring-dosing device for fluids, in particular for the dosing of food in the industrial raising of poultry, pigs or rabbits, irrigation, or any dosing of liquids effected continuously in industry, said device comprising a body having a longitudinal axis, a passageway in said body for the flow of a principal fluid and having an inlet orifice and distribution orifices for the fluid which extend through the body and open onto a side of said body, a housing coaxial with said body and fixed to said side of said body and defining a chamber with which said distribution orifices communicate, a pump having an inlet and an outlet for a secondary fluid to be mixed with the principal fluid and a dosing piston within said pump, means within said chamber for driving said pump, said means comprising at least three rods extending radially of said axis and three second pistons resectively mounted on said three rods, a crank rotatively mounted in said device and having an arm which is parallel to said axis, said three rods being rotatively mounted on said arm, said arms being drivingly connected to said dosing piston for reciprocating said dosing piston, at least three pins parallel to said axis and carried by said body, at least three cylinders respectively pivotally mounted on said three pins, each cylinder being provided with an inlet port for admitting the principal fluid into the cylinder when the inlet port is angularly positioned in confronting relation to a corresponding one of said distribution distribution orifices, means being provided for discharging the principal fluid into said chamber during the oscillation of said cylinders on each side of the respective distribution orifices.

2. A device according to claim 1, wherein said means for discharging the principal fluid into the chamber comprise a groove provided in a side of the body defining the said chamber, said groove opening onto said distribution orifices which are angularly evenly spaced apart and communicate with said outlet orifice.

3. A device according to claim 1, wherein said passageway is circular and coaxial with said body.

4. A device according to claim 1, wherein the passageway for the flow of the principal fluid is coaxial with the axis of rotation of said crank and said distribution orifices are in a number equal to the number of said cylinders.

5. A device according to claim 1, wherein a closed end of each cylinder is rounded so as to allow the movement thereof against a circular inner wall of the housing in the course of its oscillations.

6. A device according to claim 1, wherein each piston is mounted on a rod which is rotatively mounted on said arm and slidably mounted on a shaft fixed to an end portion of the respective cylinder.

7. A device according to claim 6, wherein the second pistons have the shape of a skirt having cylindrical flanges which conform to an inner wall of the respective cylinder.

8. A device according to claim 1, wherein said distribution orifices for the principal fluid are each provided with a sealing element which ensures a sealed distribution of the principal fluid into the corresponding cylinder when said inlet ports and said distribution orifices of said cylinders are at least partly in confronting relation to each other, and also ensures the seal with said cylinders during oscillations of said cylinders.

9. A device according to claim 8, wherein the sealing elements are cylindrical cups having an end wall provided with a central orifice having a diameter roughly equal to the diameter of said inlet ports of said cylinders, the difference between the outer radius and inner radius being equal to the diameter of said inlet ports.

10. A device according to claim 1, wherein each cylinder includes means for guiding the cylinder in said chamber.

11. A device according to claim 10, wherein said guiding means comprise at least one groove receiving a complementary projection of one of two elements consisting of the housing or the body or vice versa.

12. A device according to claim 1, wherein said dosing piston of said pump comprises at an end thereof opposed to the body of the pump a cross-member fixed in such manner as to form a T-shaped structure with said dosing piston and provided with a transverse slot for receiving an adjacent end portion of said arm so as to cause a reciprocating linear displacement of the dosing piston when the arm of the crank rotates.

* * * * *